United States Patent [19]

Stemme et al.

[11] 4,279,491
[45] Jul. 21, 1981

[54] APPARATUS FOR EXPOSING AND DEVELOPING FILM UNITS OR THE LIKE

[75] Inventors: Otto Stemme, Munich; Berthold Fergg; Viktor Osegowitsch, both of Taufkirchen; Wolfgang Viehrig, Munich, all of Fed. Rep. of Germany

[73] Assignee: AGFA-Gevaert, A.G., Leverkusen, Fed. Rep. of Germany

[21] Appl. No.: 96,742

[22] Filed: Nov. 23, 1979

[30] Foreign Application Priority Data

Nov. 30, 1978 [DE] Fed. Rep. of Germany ....... 2851892

[51] Int. Cl.$^3$ ....................... G03B 27/32; G03B 27/52
[52] U.S. Cl. ......................................... 355/27; 355/107
[58] Field of Search ................................... 355/27–29, 355/107

[56] References Cited

U.S. PATENT DOCUMENTS

| 2,315,452 | 3/1943 | Pifer | 355/28 |
|---|---|---|---|
| 3,252,396 | 5/1966 | Limberger et al. | 355/107 |
| 3,308,717 | 3/1967 | Okishima et al. | 355/28 |
| 4,076,412 | 2/1978 | Igarashi et al. | 355/28 |
| 4,082,446 | 4/1978 | Driscoll et al. | 355/27 |

Primary Examiner—Richard A. Wintercorn
Attorney, Agent, or Firm—Peter K. Kontler

[57] ABSTRACT

An apparatus for exposing and developing film units which have pairs of overlapping positive and negative sheets and must be subjected to a diffusion treatment subsequent to treatment with a liquid developing agent has an exposing unit above a light duct which is disposed above a compartment for cassettes containing stacks of superimposed film units. The compartment is located above a diffusion chamber and is adjacent to a relatively small casing for a developing unit containing a liquid developing agent and provided with pairs of advancing rolls for the transport of freshly exposed film units from the cassette in the compartment, through the casing and the developing agent therein, and thereupon into the diffusion chamber. The developing unit has a device which temporarily separates the sheets of a film unit during transport through the developing agent. The dimensions of the apparatus are sufficiently small to warrant its use in private homes by amateur photographers in order to make enlarged prints of color photographic negatives.

12 Claims, 1 Drawing Figure

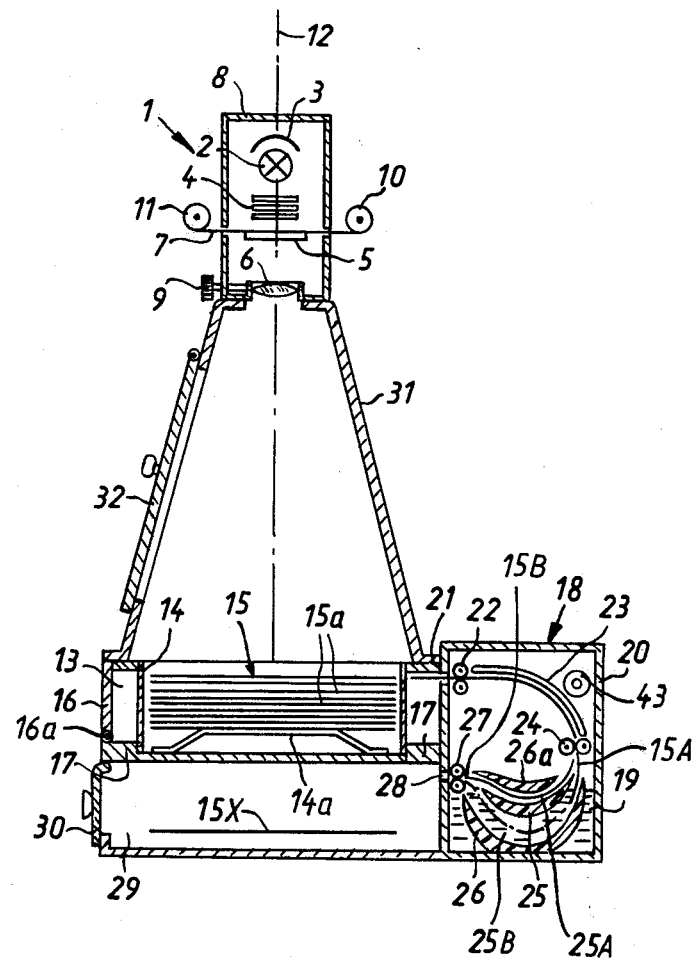

APPARATUS FOR EXPOSING AND DEVELOPING FILM UNITS OR THE LIKE

BACKGROUND OF THE INVENTION

The present invention relates to apparatus for making exposures of originals on photosensitive material, especially on film units of the type wherein two sheets overlap each other and are temporarily separated during transport through a liquid developing agent.

As a rule, the exposing unit of a developing apparatus of the class to which the present invention pertains comprises a light source, a platform for originals, a set of color filters and an adjustable optical system for focusing the image of the original onto a film unit. The photosensitive material is supported in the positive plane and is transferred into the developing unit upon completion of the exposing step.

An apparatus of the above outlined character is disclosed, for example, in U.S. Pat. No. 3,308,717 granted Mar. 14, 1967 to Okishima et al. In order to save time and labor, the enlarging and developing means are combined into a unitary structure. A drawback of the patented apparatus is that the transport of exposed photosensitive material from the exposure station to and through the developing station, especially through a series of consecutive liquid baths, is carried out by a complex and expensive advancing mechanism. Therefore, apparatus of the type disclosed in the patent to Okishima et al. are not sufficiently economical to warrant their use by individual amateur photographers who desire to make enlarged prints of their color films at home. The bulk of the patented apparatus is so substantial that such apparatus can find use solely in commercial photographic processing laboratories for mass production of prints from exposed and developed customer films.

Reference may also be had to U.S. Pat. No. 2,315,452 granted Mar. 30, 1943 to Pifer for "Photographic Apparatus".

OBJECTS AND SUMMARY OF THE INVENTION

An object of the invention is to provide a novel and improved apparatus for making reproductions of originals which can be used by amateur photographers for the making of prints at their homes.

Another object of the invention is to provide a novel and improved apparatus for completing the exposure and development of photosensitive material in a small area.

A further object of the invention is to provide a novel and improved combination of exposing and developing units which can be used to make enlarged prints of color photographic films.

An additional object of the invention is to provide a novel and improved combination of various components of an apparatus for making exposures upon and for thereupon developing film units of the type wherein two sheets of photographic material normally overlap each other.

The invention is embodied in an apparatus for exposing and developing photosensitive material, especially film units of the type having a plurality of overlapping sheets and necessitating treatment in a diffusion chamber. The apparatus comprises an exposing unit, a cassette or other suitable means for supporting photosensitive material in a predetermined position with reference to the exposing unit, a developing unit adjacent to one side of the supporting means, and a diffusion chamber below the supporting means. The developing unit has means for transporting photosensitive material from the supporting means into the diffusion chamber. As mentioned above, the photosensitive material may comprise discrete film units which must be subjected to a treatment in the diffusion chamber in order to complete the developing step.

The exposing unit may comprise a light source in front of a suitable reflector, a platform or another suitable support for originals between the light source and the supporting means for film units or the like, and an adjustable optical system between the platform and the supporting means.

The aforementioned transporting means may include means for reversing the direction of movement of photosensitive material during transport of such material from the supporting means to the diffusion chamber. The latter includes a door which is movable to and from a closed position in which the chamber is sealed against entry of outside light. A light duct may be interposed between the exposing unit and the supporting means, and such duct is then provided with a door which is normally closed to prevent entry of outside light but can be moved to open position in which an operator can observe the plane of the photosensitive material in the supporting means, e.g., the topmost or foremost film unit of a full stack of such units in a properly inserted cassette or a white cover sheet or plate which overlies the topmost film unit and enables the operator to properly focus the image of the original which registers with the optical system and rests on the aforementioned platform.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a schematic vertical sectional view of an apparatus which embodies the invention and wherein the compartment below the exposing unit can receive a cassette containing a stack of film units.

DESCRIPTION OF THE PREFERRED EMBODIMENTS

The apparatus which is shown in the drawing comprises a composite housing including a first casing 8 for an exposing unit 1, a second casing 20 for a developing unit 18, a compartment 13 for a cassette 14 containing a stack of film units 15a, a diffusion chamber 29 at a level below the compartment 13, and a downwardly diverging tubular light duct 31 between the casing 8 and compartment 13.

The exposing unit 1 in the first casing 8 comprises a light source 2 which is installed in front of a reflector 3 and can direct copying light through one or more filters of an array of filters 4 located above a platform or support 5 for originals which are to be imaged on photosensitive material. The originals are successive or selected frames of an exposed and developed customer film 7 extending between a supply reel 10 and a takeup reel 11. The spindles for these reels are mounted on the casing 8. The exposing unit 1 further comprises an adjustable optical system 6 which images an original (located on the platform 5) onto the foremost or uppermost film unit 15a in the cassette 14. The optical system 6 is adjustable by a knob 9 which is accessible at the exterior of the composite housing including the first casing 8. The knob 9 is rotated when the operator desires to sharply focus the image of an original upon the uppermost film unit 15a or upon the white surface of a plate or cover sheet in the focal plane of the optical system 6. As regards the use of cover sheets in the cassette 14, reference may be had to commonly owned copending application Ser. No. 097,719 filed Nov. 27, 1979 by Berthod Fergg et al. for "Cassette for film units".

The means for advancing the film 7 in order to place selected or successive film frames into register with the optical system 6 is not shown in the drawing. It is clear that the apparatus which is shown in the drawing can also accept discrete originals, e.g., film frames which are separated from other portions of an exposed and developed customer film.

The reference character 12 denotes the axis of the optical system 6. This axis is normal to a predetermined plane, namely, to the plane of the uppermost film unit 15a in the cassette 14. The compartment 13 for the cassette 14 has a door 16 which is pivotable at 16a so as to enable the operator to insert a fresh cassette 14 subsequent to removal of an empty cassette. If desired, the illustrated apparatus can be simplified by replacing the entire compartment 13 with a slot for reception of one film unit 15a at a time. The interior of the compartment 13 is provided with guide means 17 to insure accurate positioning of an inserted cassette 14 with reference to the optical axis 12 of the system 6. The guide means 17 may constitute or include stops for the casing of the inserted cassette 14. Each film unit 15a in the cassette 14 comprises a negative sheet 15A and a positive sheet 15B. One marginal portion of the negative sheet 15A extends forwardly (to the right, as viewed in the drawing) beyond the corresponding marginal portion of the associated positive sheet 15B, so that the projecting marginal portion of the sheet 15A constitutes the leader of the respective film unit 15a. The foremost or uppermost film unit in the cassette 14 is denoted by the reference character 15. This film unit is in register with an elongated horizontal slit-shaped opening 21 which connects the interior of the compartment 13 with the interior of the second casing 20. Reference may be had to our commonly owned copending application Ser. No. 097,720 filed Nov. 27, 1979 for "Apparatus for exposing and developing photosensitive material". A spring 14a in the cassette 14 urges successive film unit 15a into the plane of the topmost unit 15 so that a film unit is always ready for exposure to light as soon as the previously exposed film unit is transferred into the casing 20 of the developing unit 18. One mode of transferring the foremost film unit into the casing 20 is fully disclosed and claimed in the aforesaid copending applications Ser. Nos. 097,719 and 097,720, to which reference may be had for all necessary details. The cassette 14 can be said to constitute a means for supporting the topmost film unit 15 in a predetermined position with reference to the exposing unit 1.

As mentioned above, the leader of the foremost film unit 15 extends to the right, as viewed in the drawing, so that it can be moved into the nip of two advancing rolls 22 which are installed in the interior of the casing 20 and form part of the developing unit 18. The rolls 22 advance the freshly exposed film unit 15 along the concave guide face of an arcuate deflector 23 and into the nip of two further advancing rolls 24. These rolls advance the film unit 15 against a separating device 25 which is flanked by two arcuate guides 26, 26a. These guides define with the separating device 25 two discrete channels 25A, 25B for the sheets 15A, 15B of the film unit 15. The channels 25A, 25B are immersed in a bath consisting of a liquid developing agent 19 which fills the lower part of the casing 20 (or a discrete vessel in the casing 20) to a level slightly below that of a second horizontal slit-shaped opening 28 serving to allow entry of successive film units 15 into the diffusion chamber 29. The sheets 15A, 15B of a film unit 15 are reunited prior to entering the opening 28 which is located immediately downstream of two further advancing rolls 27 performing the additional function of removing the surplus of developing agent 19 from the film units 15 which are in the process of entering the diffusion chamber 29. The latter has a door 30 which normally prevents entry of light but can be opened to permit removal of a fully developed film unit (shown at 15X). The operator thereupon separates the sheets 15A, 15B of the removed film unit 15X by hand.

If desired, the position of the compartment 13 and of a cassette 14 therein with reference to the second casing 20 can be selected in such a way that the leader of the film unit 15 in the properly inserted cassette 14 automatically enters the nip of the advancing rolls 22 (i.e., such leader extends through and beyond the opening 21). This renders it unnecessary to resort to withdrawing elements of the type disclosed in the aforesaid copending application Ser. No. 097,719 Nov. 27, 1979, of Fergg et al. Also, the advancing rolls 22 or 24 can be omitted if the developing unit 18 is constructed and assembled in a manner as disclosed in our aforesaid copending application Ser. No. 097,720, Nov. 27, 1979, wherein a manually operable knob (indicated at 43) is used to move a pair of advancing rolls along an arcuate path and to thereby cause such pair of advancing rolls to transfer the leader of the film unit 15 from the area of the opening 21 into the range of the separating device 25. When the knob 43 is thereupon rotated, the movable advancing rolls (22 or 24) as well as the rolls 27 are caused to rotate in response to rotation of the knob. Such knob can be said to constitute a common drive means for all advancing rolls in the developing unit.

The tubular duct 31 has a door 32 which can be opened by the operator during manipulation of the knob 9 so as to allow for observation of the "test exposure" on a white surface above the topmost film unit 15 in the cassette 14. The light source 2 is turned off when the "test exposure" (accurate focusing) is completed; the door 32 is then closed and the apparatus is ready for the making of an exposure.

The operation is as follows:

The door 16 is opened and a cassette 14 containing one or more film units 15a (e.g., only a single film unit 15) is inserted into the compartment 13 so that it abuts against the stop or stops 17. As mentioned above, the topmost film unit 15 can be located below a white cover sheet which is used to allow for the making of a "test exposure" while the door 32 of the duct 31 is open and the operator manipulates the knob 9 (if necessary) so as to properly focus the image of the original (located on the platform 5) upon the topmost film unit 15. The light source 2 is turned off upon completion of the focusing operation and the cover sheet is withdrawn, for example, in a manner as disclosed in the aforesaid copending application Ser. No. 097,719 of FergAlternatively, the light source 2 can remain on if the apparatus comprises a shutter which is placed somewhere between the light source 2 and the plane of the topmost film unit 15 to prevent undesired admission of light preparatory to the making of an exposure. The door 32 is closed during the making of actual exposures.

When the exposure of the topmost film unit 15 to light is completed, the drive means 43 for the advancing rolls 22, 24 and 27 is actuated to move the foremost film unit 15 from the cassette 14 (i.e., from the predetermined plane in the compartment 13) into the casing 20 and thence into the diffusion chamber 29. If desired, the aforementioned cover sheet above the topmost film unit 15 in the cassette 14 can be withdrawn by the advancing rolls 22 prior to the making of an exposure. In such instance, the advancing rolls 22 (and, if necessary, also the advancing rolls 24, 27) are driven by the means 43 or otherwise to remove the cover sheet and are arrested as soon as the negative sheet 15A of the film unit 15 is fully exposed. The exposure is made thereafter by opening the shutter or by turning on the light source 2 while an original (e.g., a frame of the film 7) overlies the platform 5. In the next step, the advancing rolls 22, 24, 27 are set in motion again and the freshly exposed film unit 15 is introduced into the casing 20. The sheets 15A, 15B of such film unit 15 are separated by the device 25 as they enter the bath 19 so that the sheets 15A and 15B respectively advance through the channels 25A, 25B and are reunited upstream of the advancing rolls 27 which deliver the reassembled film unit 15 into the interior of the diffusion chamber 29. The reuniting is effected as a result of pressure which is applied by the rolls 27. The film unit 15 remains in the chamber 29 for a given period of time and is thereupon removed via door 30. The sheets 15A and 15B of the removed film unit 15 are separated by hand.

The improved apparatus is susceptible of many further modifications without departing from the spirit of the invention. For example, the cassette 14 can be configurated in such a way that the compartment 13 becomes unnecessary. Thus, the housing of the cassette 14 performs the function of the compartment 13 as soon as the modified cassette is inserted into the space between the tubular duct 31 and the diffusion chamber 29. Alternatively, the compartment 13 can be merely simplified by omitting the door 16 if the cassette 14 is configurated in such a way that it seals the opening for insertion of cassettes into the compartment 13 as soon as it is properly introduced into such simplified compartment. The cassette must also prevent entry of light via opening 21 as soon as it is inserted into the compartment below the duct 31.

The apparatus (or the cassette 14) may comprise means for positively advancing the leaders of successive topmost film units into the nip of the rolls 22 in the casing 20. This is often desirable in order to ensure that, when driven, the rolls 22 invariably advance a film unit into the range of the second advancing rolls 24.

Still further, and as disclosed in the copending application Ser. No. 097,719 of Fergg et al., the cassette 14 can contain several cover sheets, one above each and every film unit, so as to enable an operator to focus prior to the making of each and every exposure. The cover sheets can be removed by hand through a light-tight mouthpiece of the compartment 13, by resorting to flexible withdrawing elements or by advancing the cover sheets through the casing 20.

As mentioned above, the compartment 13 can be simplified or replaced by a slot if the apparatus is to accept discrete film units rather than cassettes for stacks of overlapping film units. Each discrete film unit can be provided with a removable cover sheet to facilitate accurate focusing, and each such film unit can be properly inserted (so that its leader can be engaged by the advancing rolls 22) by hand or by automatic or semiautomatic inserting means.

Two important advantages of the improved apparatus are its compactness and low cost. This is achieved by resorting to a developing procedure which includes treatment of film units in the diffusion chamber 29 and by placing the chamber 29 below the locus for insertion of discrete film units or stacks of film units. The just described procedure of developing color prints by resorting to a diffusion chamber renders it possible to assemble all necessary units into an apparatus which is sufficiently small for use in private homes and is sufficiently inexpensive to warrant its purchase by amateur photographers. The developing station is very short because the casing 20 need not accommodate all components of the developing means, i.e., the chamber 29 is placed below the compartment 13, and the height of the relatively short casing 20 need not appreciably exceed the combined height of the compartment 13 and chamber 29.

Another reason for the surprising compactness of the improved apparatus is that the film units which are transported from the cassette 14 (i.e., from the compartment 13) into the diffusion chamber 29 are caused to move along a substantially U-shaped path, so that the film units reverse the direction of their movement during transport through the developing bath. The upper leg of the U-shaped path is substantially horizontal and is used to allow for advancement of film units into the range of the acruate guide 23; the web of the path is substantially semicircular; and the lower leg of the path (along which the film units advance into the chamber 29) is again substantially horizontal.

The placing of the diffusion chamber 29 below the compartment 13 is believed to be the main or at least a very important factor which contributes to a substantial reduction in the dimensions of the composite housing including the casings 8, 20, duct 31, compartment 13 and chamber 29. The chamber 29 merely causes a minor increase in the height of the apparatus but allows for a substantial reduction of the width and depth of the composite housing, when compared with the dimensions of the housing in a conventional apparatus for exposure and development of photosensitive material.

A further important advantage of the improved apparatus is that the exact speed of movement of film units through the casing 20 is not critical, so that the advancing rolls in the casing 20 can be driven by hand (via knob 43) or by a simple electric motor or another rudimentary prime mover which is not only inexpensive but consumes minimal amounts of energy.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. In an apparatus for exposing and developing photosensitive material including discrete units which must be subjected to a diffusion treatment upon completion of a developing treatment, such as film units having a plurality of overlapping sheets, the combination of an exposing unit; means for supporting photosensitive material in a predetermined position with respect to said exposing unit; a developing unit adjacent to said supporting means; and a diffusion chamber below said supporting means, said developing unit having means for transporting exposed photosensitive material from said supporting means into said chamber and said transporting means including means for reversing the direction of movement of photosensitive material during transport of such material from said supporting means into said chamber.

2. The combination of claim 1, wherein said exposing unit comprises a light source, a support for originals disposed between said light source and said supporting means, and an adjustable optical system between said support and said supporting means.

3. The combination of claim 1, wherein said chamber includes a door which is movable to and from a closed position in which the chamber is sealed against entry of light.

4. In an apparatus for exposing and developing photosensitive material including discrete units which must be subjected to a diffusion treatment upon completion of a developing treatment, such as film units having a plurality of overlapping sheets, the combination of an exposing unit; means for supporting photosensitive material in a predetermined position with respect to said exposing unit; a light duct interposed between said exposing unit and said supporting means, said duct having a door which is movable to and from a closed position in which the door prevents entry of outside light into said duct; a developing unit adjacent to said supporting means; and a diffusion chamber below said supporting means, said developing unit having means for transporting exposed photosensitive material from said supporting means into said chamber.

5. The combination of claim 4, wherein said door is movable to an open position so as to permit the observation of the plane of photosensitive material in said supporting means.

6. The combination of claim 1, wherein said transporting means includes several pairs of advancing rolls in said developing unit.

7. The combination of claim 6, wherein said transporting means further comprises common drive means for said rolls.

8. The combination of claim 1, further comprising a casing for said developing unit, said casing having a first opening for admission of photosensitive material from said supporting means and a second opening for transfer of photosensitive material from said casing into said diffusion chamber.

9. The combination of claim 8, further comprising a liquid bath in said casing and means for guiding photosensitive material through said bath during transport from said first toward said second opening.

10. The combination of claim 9, wherein said openings are located above the upper level of the bath in said casing.

11. The combination of claim 10, wherein said discrete units are film units having pairs of overlapping sheets and said developing unit further comprises means for temporarily separating the sheets of successive film units during transport through said bath.

12. The combination of claim 1, wherein the combined height of said supporting means and said chamber approximates the height of said casing.

* * * * *